(12) United States Patent
Weatherhead et al.

(10) Patent No.: US 7,844,349 B2
(45) Date of Patent: Nov. 30, 2010

(54) STANDARD MES INTERFACE FOR DISCRETE MANUFACTURING

(75) Inventors: N. Andrew Weatherhead, Ayr (CA); Mark K. Carmount, Ayr (CA); Jennifer Wei, Maple (CA); Kenneth Carl Meyer, Lititz, PA (US); Ronald L. Mauk, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 512 days.

(21) Appl. No.: 11/861,562

(22) Filed: Sep. 26, 2007

(65) Prior Publication Data

US 2008/0097623 A1   Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
    *G06F 19/00*   (2006.01)
(52) U.S. Cl. .................... 700/19; 700/3; 700/29
(58) Field of Classification Search .................... 700/1, 700/3, 19, 29
    See application file for complete search history.

(56) References Cited

U.S. PATENT DOCUMENTS

| 3,928,772 | A | 12/1975 | Mooney |
| 4,118,635 | A | 10/1978 | Barrett et al. |
| 4,215,396 | A | 7/1980 | Henry |
| 4,519,027 | A | 5/1985 | Vogelsberg |
| 4,570,217 | A | 2/1986 | Allen et al. |
| 4,602,324 | A | 7/1986 | Fujawa et al. |
| 4,910,691 | A | 3/1990 | Skeirik |
| 4,990,057 | A | 2/1991 | Rollins |
| 5,058,043 | A | 10/1991 | Skeirik |
| 5,068,778 | A | 11/1991 | Kosem et al. |
| 5,214,577 | A | 5/1993 | Sztipanovits et al. |
| 5,255,197 | A | 10/1993 | Iida |
| 5,262,954 | A | 11/1993 | Fujino et al. |
| 5,388,318 | A | 2/1995 | Petta |
| 5,420,977 | A | 5/1995 | Sztipanovits et al. |
| 5,450,346 | A | 9/1995 | Krummen et al. |

(Continued)

FOREIGN PATENT DOCUMENTS

EP   1770464   4/2007

OTHER PUBLICATIONS

OA mailed Dec. 17, 2009 for U.S. Appl. No. 11/855,646, 23 pages.

(Continued)

*Primary Examiner*—Michael D Masinick
(74) *Attorney, Agent, or Firm*—Turocy & Watson LLP; Alexander R. Kuszewski; John M. Miller

(57) ABSTRACT

The claimed subject matter provides a system and/or a method that facilitates data transportation between two ore more systems. A manufacturing execution system (MES) can include a portion of recipe data associated with discrete manufacturing. An MES interface component can seamlessly communicate with the manufacturing execution system (MES) to delivery and execute the portion of recipe data within a controller-based discrete automation environment.

21 Claims, 12 Drawing Sheets

U.S. PATENT DOCUMENTS

| | | | |
|---|---|---|---|
| 5,555,179 A | 9/1996 | Koyama et al. |
| 5,673,194 A | 9/1997 | Cipelletti et al. |
| 5,751,582 A | 5/1998 | Saxena et al. |
| 5,880,954 A | 3/1999 | Thomson et al. |
| 5,920,717 A | 7/1999 | Noda |
| 5,946,212 A | 8/1999 | Bermon et al. |
| 6,008,985 A | 12/1999 | Lake et al. |
| 6,289,252 B1 | 9/2001 | Wilson et al. |
| 6,397,114 B1 | 5/2002 | Eryurek et al. |
| 6,449,624 B1 | 9/2002 | Hammack et al. |
| 6,459,944 B1 | 10/2002 | Maturana et al. |
| 6,501,995 B1 | 12/2002 | Kinney et al. |
| 6,527,018 B2 | 3/2003 | Yamauchi et al. |
| 6,535,769 B1 | 3/2003 | Konar |
| 6,563,891 B1 | 5/2003 | Eriksson et al. |
| 6,615,091 B1 | 9/2003 | Birchenough et al. |
| 6,662,061 B1 | 12/2003 | Brown |
| 6,675,324 B2 | 1/2004 | Marisetty et al. |
| 6,708,104 B2 | 3/2004 | Avery, Jr. et al. |
| 6,760,630 B2 | 7/2004 | Turnaus et al. |
| 6,832,118 B1 | 12/2004 | Heberlein et al. |
| 6,853,920 B2 | 2/2005 | Hsiung et al. |
| 6,859,755 B2 | 2/2005 | Eryurek et al. |
| 6,865,432 B2 | 3/2005 | Brown |
| 6,996,741 B1 | 2/2006 | Pittelkow et al. |
| 7,058,712 B1 | 6/2006 | Vasko et al. |
| 7,089,155 B2 | 8/2006 | Hegel |
| 7,089,530 B1 | 8/2006 | Dardinski et al. |
| 7,117,504 B2 | 10/2006 | Smith et al. |
| 7,123,978 B2 * | 10/2006 | Hartman et al. ............. 700/108 |
| 7,149,595 B2 | 12/2006 | D'Mura |
| 7,162,534 B2 | 1/2007 | Schleiss et al. |
| 7,171,281 B2 | 1/2007 | Weber et al. |
| 7,249,356 B1 | 7/2007 | Wilson et al. |
| 7,254,457 B1 | 8/2007 | Chen et al. |
| 7,289,861 B2 | 10/2007 | Aneweer et al. |
| 7,307,986 B2 | 12/2007 | Henderson et al. |
| 7,313,453 B2 | 12/2007 | Kline |
| 7,333,024 B2 | 2/2008 | Nickolaou et al. |
| 7,415,708 B2 | 8/2008 | Knauerhase et al. |
| 7,424,331 B2 | 9/2008 | Patel |
| 7,725,200 B2 | 5/2010 | Reed et al. |
| 2001/0049562 A1 | 12/2001 | Takano et al. |
| 2002/0010908 A1 | 1/2002 | Cheng et al. |
| 2002/0042896 A1 | 4/2002 | Johnson et al. |
| 2002/0059467 A1 | 5/2002 | Rapp et al. |
| 2002/0100014 A1 | 7/2002 | Iborra et al. |
| 2003/0051071 A1 | 3/2003 | Stefansson et al. |
| 2003/0149756 A1 | 8/2003 | Grieve et al. |
| 2003/0177018 A1 | 9/2003 | Hughes |
| 2003/0220709 A1 * | 11/2003 | Hartman et al. ............. 700/121 |
| 2004/0095833 A1 | 5/2004 | Marisetty et al. |
| 2004/0158713 A1 | 8/2004 | Aneweer et al. |
| 2004/0172612 A1 | 9/2004 | Kasravi et al. |
| 2004/0181294 A1 | 9/2004 | Deitz et al. |
| 2004/0243260 A1 | 12/2004 | Law et al. |
| 2004/0267515 A1 | 12/2004 | McDaniel et al. |
| 2005/0004781 A1 | 1/2005 | Price et al. |
| 2005/0015769 A1 | 1/2005 | Gegner |
| 2005/0028133 A1 | 2/2005 | Ananth et al. |
| 2005/0125512 A1 | 6/2005 | Fuller et al. |
| 2005/0227217 A1 | 10/2005 | Wilson |
| 2006/0026193 A1 | 2/2006 | Hood |
| 2006/0085084 A1 | 4/2006 | Nickolaou et al. |
| 2006/0101433 A1 | 5/2006 | Opem et al. |
| 2006/0230383 A1 | 10/2006 | Moulckers et al. |
| 2006/0259157 A1 | 11/2006 | Thurner |
| 2006/0265688 A1 | 11/2006 | Carlson et al. |
| 2006/0265695 A1 | 11/2006 | Arai |
| 2007/0061125 A1 | 3/2007 | Bhatt et al. |
| 2007/0089100 A1 | 4/2007 | Morris et al. |
| 2007/0100486 A1 | 5/2007 | Burda et al. |
| 2007/0101193 A1 | 5/2007 | Johnson et al. |
| 2007/0162268 A1 | 7/2007 | Kota et al. |
| 2007/0186090 A1 | 8/2007 | Yu et al. |
| 2007/0220483 A1 | 9/2007 | Motoyama et al. |
| 2007/0234283 A1 | 10/2007 | Baluja et al. |
| 2007/0261027 A1 | 11/2007 | Dhanakshirur et al. |
| 2007/0269297 A1 | 11/2007 | Meulen et al. |
| 2008/0082186 A1 * | 4/2008 | Hood et al. ................... 700/83 |
| 2008/0120129 A1 | 5/2008 | Seubert et al. |
| 2008/0126407 A1 | 5/2008 | Shimaoka et al. |
| 2008/0188960 A1 | 8/2008 | Nixon et al. |

OTHER PUBLICATIONS

OA mailed Oct. 29, 2009 for U.S. Appl. No. 11/856,563, 55 pages.
OA mailed May 5, 2009 for U.S. Appl. No. 11/864,664, 21 pages.
OA mailed May 13, 2009 for U.S. Appl. No. 11/864,733, 23 pages.
OA mailed May 12, 2009 for U.S. Appl. No. 11/856,563, 30 pages.
OA mailed May 6, 2009 for U.S. Appl. No. 11/864,678, 22 pages.
OA dated Apr. 6, 2010 for U.S. Appl. No. 11/855,646, 24 pages.
OA dated Sep. 19, 2010 for U.S. Appl. No. 11/774,824, 32 pages.
The Instrumentation System, and Automation society, "Batch Control, Part 1: Models and Terminology", 1995, The Instrument Society of America, 95 pages.
Maffezzoni et al., "Object-oriented models for advanced automation engineering", Apr. 1999, Control Engineering Practice 7, pp. 957-968.

* cited by examiner

STANDARD MES INTERFACE FOR DISCRETE MANUFACTURING

CROSS REFERENCE TO RELATED APPLICATION

This application claims the benefit of U.S. Provisional Patent Application No. 60/862,403, entitled "MODULE CONTROL AND STATE PROPAGATION," filed on Oct. 20, 2006, and U.S. Provisional Patent Application No. 60/890,973, entitled "MODULE CONTROL AND STATE PROPAGATION," filed on Feb. 21, 2007, the entireties of which are incorporated herein by reference.

TECHNICAL FIELD

The claimed subject matter relates generally to industrial control systems and more particularly to interfacing data in a standardized manner in connection with Manufacturing Executing Systems (MES) and controller-based discrete automation environments.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (e.g., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

For several years, the batch process industry has been applying modular techniques based upon the ISA S88 standard. With such standard, the industry has realized significant benefits due to the reduction of development time, decreased time to market, product consistency, and many others. On the contrary, there is limited amount of reuse within discrete manufacturing segments associated with automation. Data, coding, applications, etc. are typically not reused within discrete manufacturing due to variability of procedures for different machines and the variability of equipment. In other words, there are a plurality of machines that can employ numerous procedures in a number of ways which can complicate the re-usability of data associated therewith. Additionally, abstraction of procedure and equipment in accordance with the S88 standard has not been adapted within discrete manufacturing.

Such problems and complications are compounded by manufacturing trends at the enterprise level. Manufacturers need to leverage Enterprise Resource Planning (ERP) and Manufacturing Execution System (MES) investment across the entire manufacturing enterprise. Integration of MES systems with discrete manufacturing environments are largely custom systems due to the perceived lack of re-use within the automation control system and/or environment and/or interface between the control system and the MES system. Yet, these custom solutions yield numerous faults, problems, and concerns. Custom integration is a time consuming and extremely expensive project to implement between a discrete manufacturing environment and MES systems. By their very nature of being unique and specific, custom integration techniques require intensive testing and verification. Additionally, custom solutions are difficult to maintain (e.g., based on the continuously changing environments, etc.). Lastly, custom solutions are difficult and expensive to implement.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation relates to systems and/or methods that facilitate communicating data between a Manufacturing Execution System (MES) and an automation environment. An MES interface component can be utilized to interface and/or transport a portion of data (e.g., a control recipe, a recipe, etc.) related to a manufacturing execution system (MES) layer to an automation layer. Generally, the subject innovation can provide a generalized interface (e.g., the MES interface component) for portions of MES data (e.g., applications, control recipes, recipes, etc.). The MES interface component can utilize S88 and/or S95 process standards associated with controller-based automation, and in particular, discrete manufacturing. The MES interface component can treat a work cell (e.g., S95 defined) as a similar object with a predefined interface and made up of a known (e.g., S88) hierarchy of equipment phases, equipment modules, and control modules. With such techniques, the MES interface component can provide standardized interfacing between the automation layer from the information layer (e.g., MES layer). In other aspects of the claimed subject matter, methods are provided that facilitate utilizing a control recipe associated with a Manufacturing Execution System (MES) within a controller-based recipe execution system via a universal MES interface.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
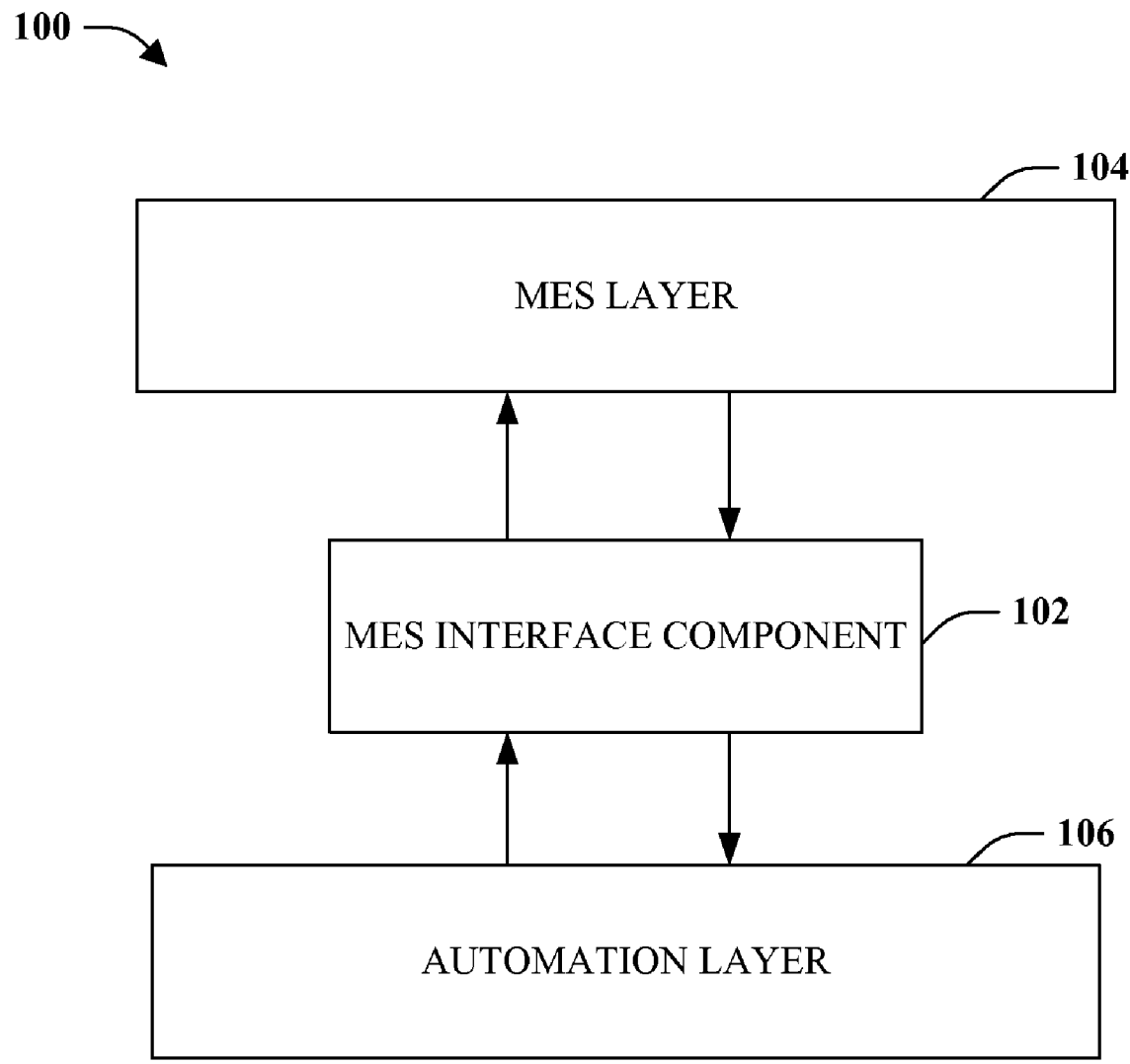
FIG. 1 illustrates a block diagram of an exemplary system that facilitates communicating data between a Manufacturing Execution System (MES) and an automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Now turning to the figures, FIG. 1 illustrates a system 100 that facilitates communicating data between a Manufacturing Execution System (MES) and an automation environment. The system 100 can include a Manufacturing Execution System (MES) interface component 102 that can seamlessly and universally communicate between an MES layer 104 and an automation layer 106. The MES interface component 102 can enable universal and/or standardized receipt and execution of a control recipe associated with discrete manufacturing. In more detail, the MES layer 104 can include at least one control recipe utilized in connection with discrete manufacturing, wherein such control recipe can be communicated in a standardized manner (via the MES interface component 102) to the automation layer 106 for execution. In other words and more generally, the MES interface component 102 can be utilized to interface and/or transport a portion of data (e.g., a control recipe, a recipe, a portion of data related to an MES application, a portion of data related to MES software, etc.) related to the MES layer 104 to the automation layer 106. It is to be appreciated that a control recipe can be a type of recipe (e.g., a set of information that uniquely defines the production requirements for a specific product) which, through execution, defines the manufacture of a single batch of a specific product.

The system 100 can provide a controller-based structure for executing a flexible control recipe and structure of the MES data interface and transport mechanism (e.g., the MES interface component 102) used to interface an MES system (e.g., the MES layer 104) to the controller-based recipe execution system (e.g., the automation layer 106). The MES interface component 102 can be utilized in connection with communicating and executing a control recipe for discrete manufacturing in a standardized manner. The system 100 can utilize a modular programming technique and/or concept in order to achieve such standardization. In general, the MES interface component 102 can allow a control recipe from the MES layer 104 to be executed within the automation layer 106 in a uniform manner by utilizing at least one of a technique, a method, or a mechanism associated with S88 and S95 standards.

In addition, the MES layer 104 can be any suitable MES that can include at least one control recipe in connection with a discrete manufacturer, company, enterprise, and the like. For instance, the MES layer 104 can be a shop floor control system which includes either manual or automatic labor and production reporting as well as on-line inquiries and links to tasks that take place on the production floor. Furthermore, the MES layer 104 can include links to work orders, receipt of goods, shipping, quality control, maintenance, scheduling, and other related tasks. Moreover, it is to be appreciated and understood that the automation layer 106 can be any suitable controller-based automation environment, controller-based automation manufacturer, automation factory, automation enterprise, controller-based recipe execution system, and the like.

The system 100 can implement the MES interface component 102 for diverse manufacturing sectors by enforcing modular programming principals. For example, the modular programming principals can be related to at least one of Object Oriented Programming, S95 standards, or S88 standards. For instance, the following principals or concepts can be utilized by the system 100, and in particular, the MES interface component 102: 1) Encapsulation—Encapsulation can dictate that an object's data can be accessed/modified by the object's methods, and can not be accessed/modified directly by the object's client; 2) Polymorphism—Polymorphism can be the ability of multiple Objects to be treated the same by their clients, although they may behave quite differently; and/or 3) Inheritance—Inheritance can refer to a Class of Objects or Sub-Class, which may automatically inherit the specific characteristics from an existing Class.

By treating each work cell (e.g., dissimilar machines grouped to produce a family of parts having similar manufacturing requirements, a unit within S88 standards, etc.), within the automation solution, as similar objects with a predefined interface and made up of a known hierarchy of equipment phases, equipment modules, and control modules, the techniques of interfacing with the automation layer 106 from the MES layer 104 (e.g., the information layer) are standardized. With such techniques, the system 100 builds the MES interface component 102 as a standard interface that increases the flexibility of a control system in comparison to monolithic programming techniques.

Figure 3:
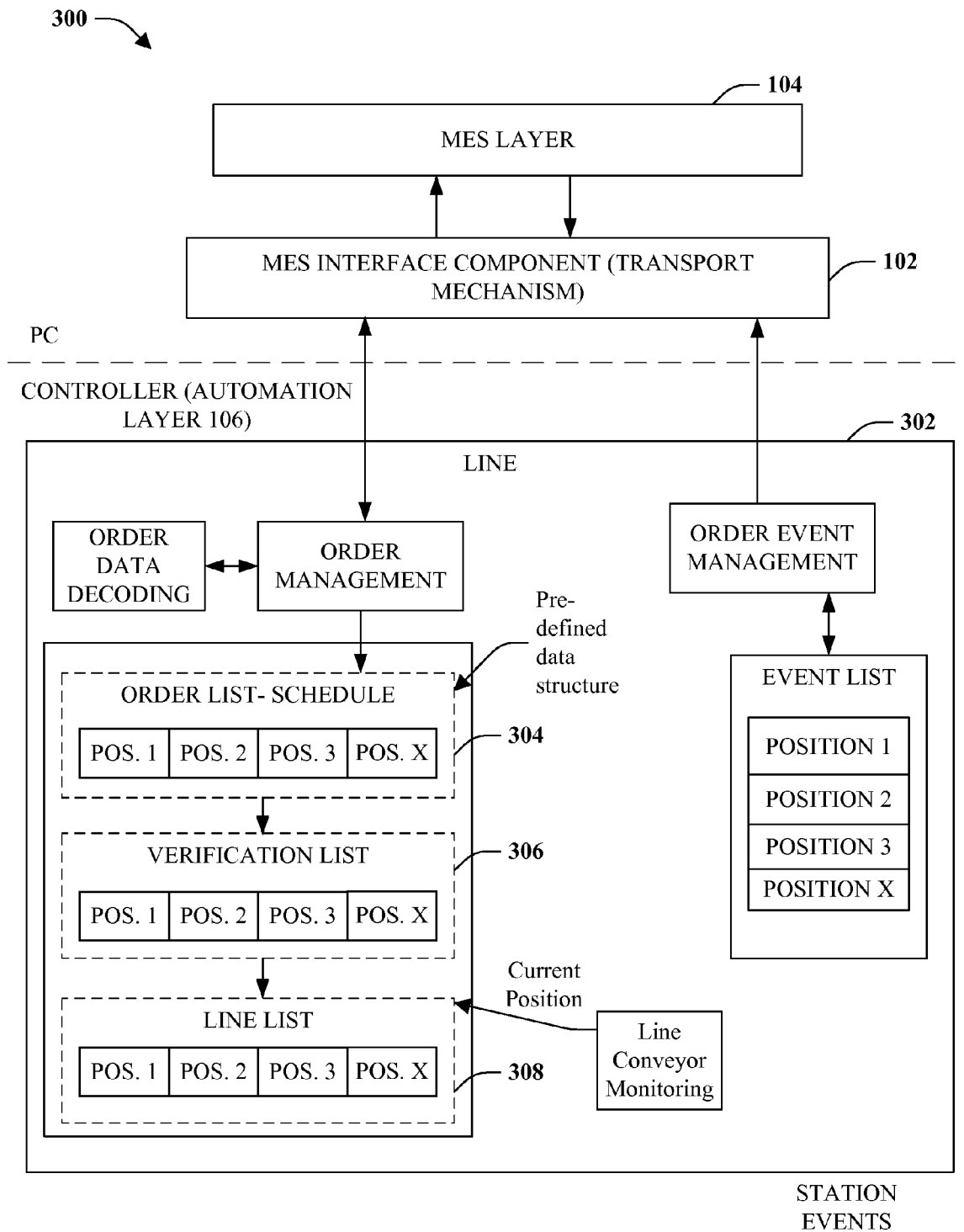
FIG. 3 illustrates a block diagram of an exemplary system that communicates data between an MES layer and an automation layer by employing a defined transport mechanism and/or a predefined data structure.
Figure 4:
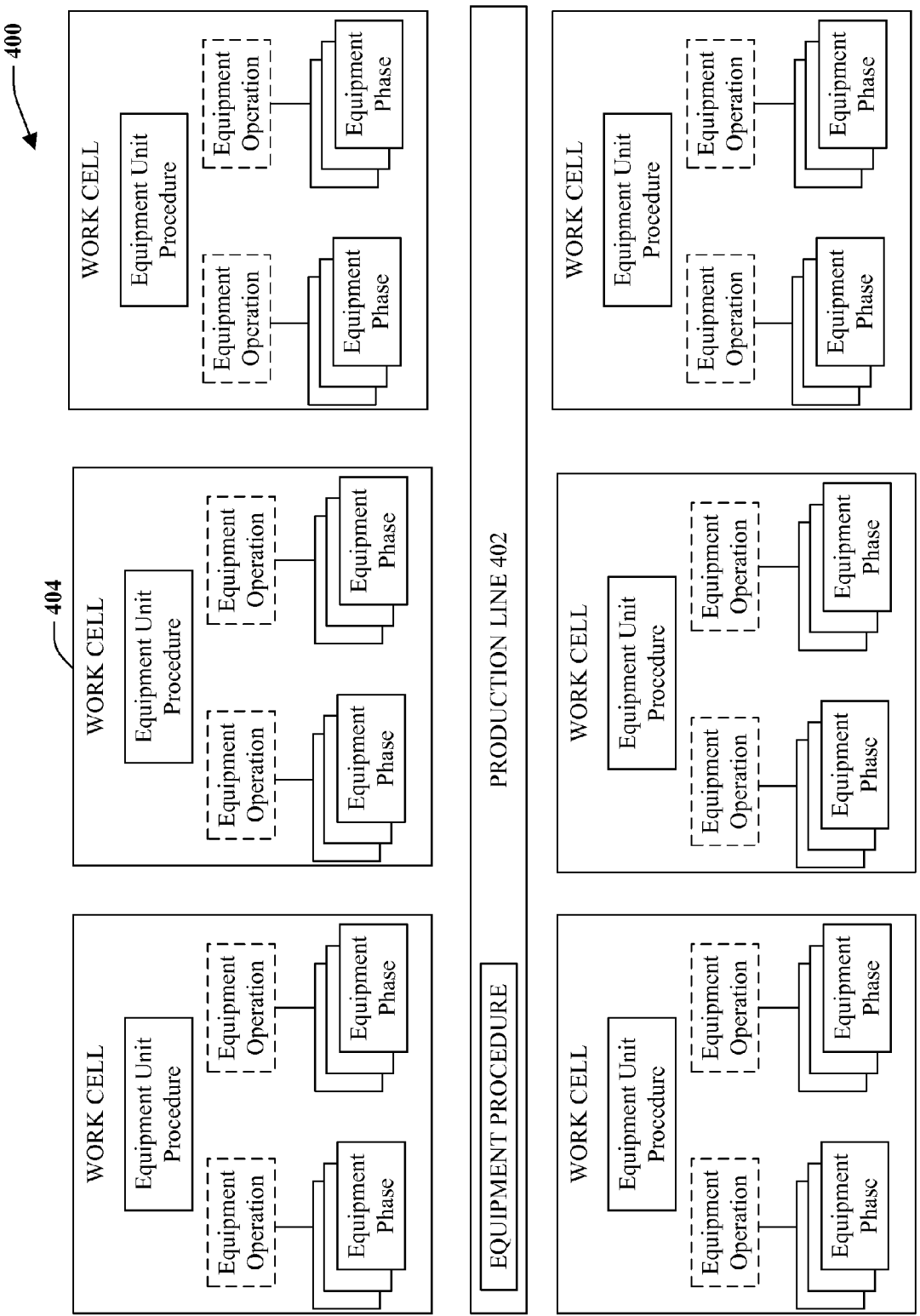
FIG. 4 illustrates a block diagram of an exemplary system that facilitates implementing discrete manufacturing in accordance with the subject innovation.

The system 100 can provide at least one of the following: 1) Data Structure and Transportation Mechanism (discussed in more detail in FIGS. 2 and 3); and 2) Procedural Execution (discussed in FIG. 4). The data structure and transport mechanism can enable data to be sent from the MES layer 104 to the automation layer 106 (e.g., automation controller). The system 100 can interpret data from the information layer and act on this data as if it were a set of instructions for running a line (e.g., recipe, etc.). The procedural execution can allow the automation layer 106 (e.g., the controller) to remain responsible for at least one of execution of work cell level sequencing (e.g., equipment procedure), a safety interlock, a personnel interlock, a persistent control at a device level, responsibility for data shirting as components move down a line, or responsibility for data manipulation as components move down a line.

The various embodiments associated with the system 100, and in particular, the MES interface component 102 can operate separately or in conjunction with various systems including Advanced Process control, various business systems, machine or manufacturing execution systems (MES), an MES Appliances, and so forth. A MES system (e.g., the MES layer 104) can include an Enterprise business system, Quality system, Warehouse and supply chain systems, and so forth. An MES system, such as the MES layer 104, can include key functions, such as detailed scheduling, work order execution and dispatching, definition management, resource management, data collection, and order management. An MES Appliance can perform processing related to various aspects (e.g., business logic, data storage, and so on), can be incorporated on software modules that can operate various aspects of a business, manufacturing environment and the like and can operate and be serviced utilizing various information technology resources. The system 100 can directly or indirectly derive their value out of configuration and interaction with Manufacturing/Automation systems and/or other MES type systems. Additionally, the various aspects can be employed in an industrial automation environment and/or in other environments in which such aspects are deemed appropriate.

It is to be appreciated that module components and/or phase components associated with the MES interface component 102, the MES layer 104, the automation layer 106, a Manufacturing Execution System (MES), an automation system, an automation environment, a controller-based execution system, a system that utilizes a S88 standard, a system that utilizes a S95 standard, a discrete manufacturing environment, etc. can be an association of logic with one or more resources. The logic includes program code that can alter the state of a resource for example, ladder code, function chart, script, JAVA, C code, and so forth. The resources are those components or elements that perform an activity in a system including equipment and personnel that perform work in a system. Other examples of types of resources include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). In general, the modules hide the user from internal interfaces, messages, and logic specific to the resources yet provide standard or generic interfaces to external systems or between components.

Modules may include other modules including nested modules where standard module behaviors and attribute patterns can be represented using common data model representations for module classes, module templates and module inheritance. Module classes and templates can be maintained in libraries which facilitate access to desired system functionality and further promote system integration. Resources can have various states associated therewith such as common S88 state classifications including idle, hold, abort, run, reset, stop, restart, and so forth where the module can present logic to represent state machines that manage the state of the resource. During application, resource modules (described below) can take on the name of the resource that is the primary focus on the module. For example, an Equipment module is primarily focused on coordination of equipment but may involve personnel in the process. Similarly, a Personnel module is focused on coordination of personnel but may involve other resources in the process. A Control Module that manages a material may be referred to as a Material Control Module and so forth.

It is noted that components associated with the system 100 can include various computer or network components such as servers, clients, programmable logic controllers (PLCs), communications modules, mobile computers, wireless components, control components and so forth which are capable of interacting across a network. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, sensor, Human Machine Interface (HMI) that communicate via the network which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
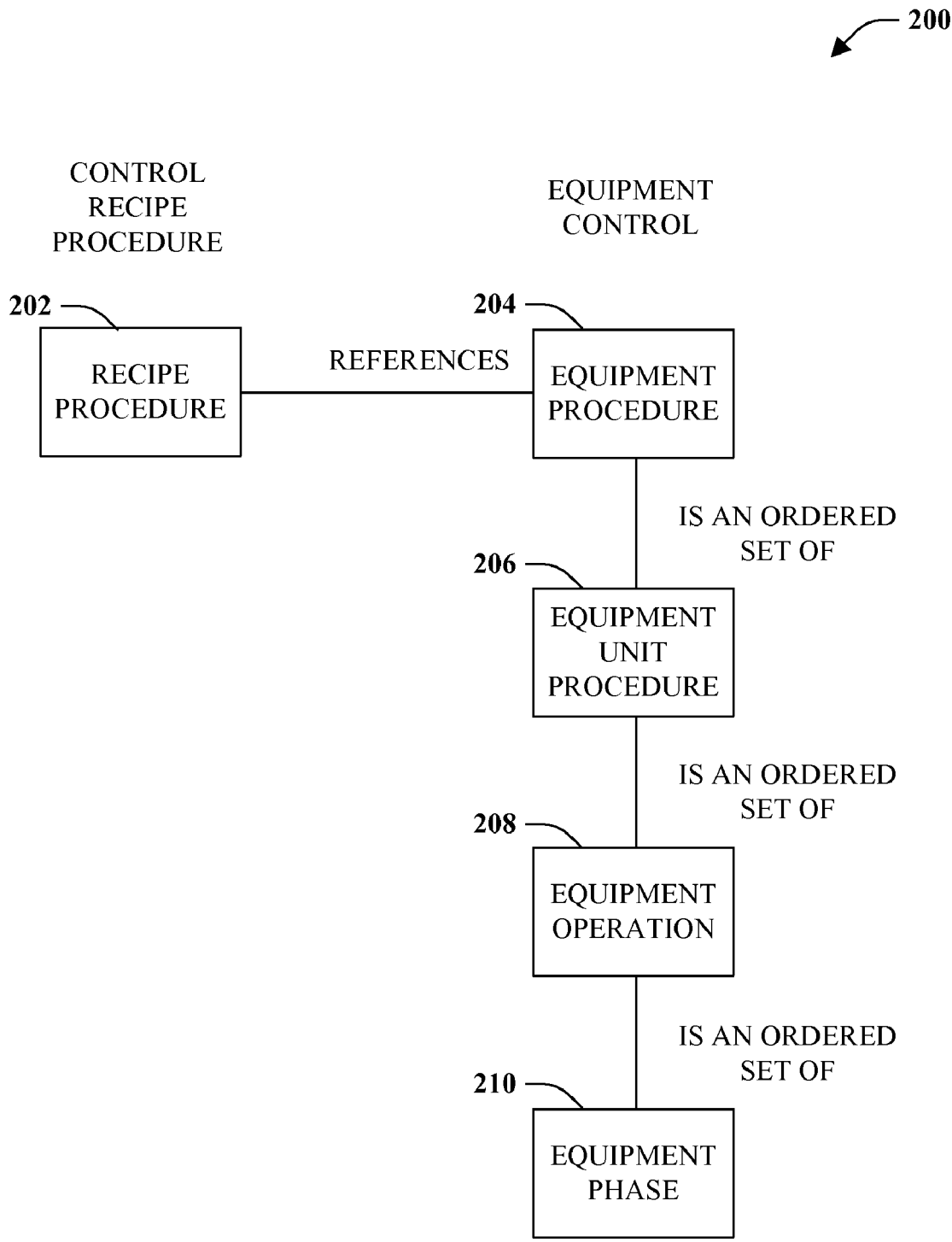
FIG. 2 illustrates a block diagram of an exemplary hierarchy that facilitates utilizing a control recipe associated with a Manufacturing Execution System (MES) within a controller-based recipe execution system via a universal MES interface.

FIG. 2 illustrates a hierarchy 200 that facilitates utilizing a control recipe associated with a Manufacturing Execution System (MES) within a controller-based recipe execution system via a universal MES interface. The hierarchy 200 can employ the MES interface component (not shown but discussed in FIG. 1) that can provide seamless and uniform data communication and execution between the MES layer (not shown but discussed in FIG. 1) and the automation layer (not shown but discussed in FIG. 1). In particular, the subject innovation can allow a control recipe associated with the MES layer to be received, communicated, and/or executed within the automation layer in a standardized manner.

The hierarchy 200 can include a control recipe that can be defined as a component of a work order within the MES layer (e.g., a MES system, etc.). A control recipe procedure can include a recipe procedure 202. An equipment control can include an equipment procedure 204 that is referenced by the recipe procedure 202. It is to be appreciated that the equipment procedure 204 can be a procedure that is part of equipment control. The equipment procedure 204 can be an ordered set of an equipment unit procedure 206 (e.g., a unit procedure can be a part of equipment control). The unit procedure can be a strategy for carrying out contiguous process (e.g., work) within a unit (e.g., a work cell). The equipment unit procedure 206 can be an ordered set of an equipment operation 208, wherein the equipment operation 208 can be an operation that is part of equipment control. Moreover, an operation can be a procedural element defining an independent processing activity including an algorithm related to at least one of initiation, organization, or a control of a phase. The equipment operation 208 can be an ordered set of an equipment phase 210. The equipment phase 210 can be a phase that is part of equipment control, wherein a phase can be the lowest level of procedural in the procedural control model.

By utilizing the hierarchy 200, each equipment operation 208 or equipment phase 210 that supports a control recipe can be organized according to an equipment control hierarchy (e.g., the hierarchy 200). For example, the equipment control hierarchy can be the following: 1) production line (e.g., equipment procedure 204); 2) work cell (e.g., equipment unit procedure 206); 3) work cell relationship (e.g., in certain cases work cells can act in groups). As data is moved utilizing a defined transport mechanism utilized by the MES interface component, the control system (e.g., the automation layer, etc.) can translate the data for each equipment operation 208 or equipment phase 210 and place such data into the predefined equipment control data structure. For instance, the data can be stored within one or more production line (e.g., a series of pieces of equipment dedicated to the manufacture of a specific number of products or families, etc.) controllers in the form of an equipment procedure 204.

FIG. 3 illustrates a system 300 that communicates data between an MES layer and an automation layer by employing a defined transport mechanism and/or a predefined data structure. The system 300 can include the MES interface component 102 that can provide a transport mechanism for data related to the MES layer 104 to a controller-based automation layer 106. As discussed, the MES interface component 102 can provide universal and standard techniques to utilize a portion of data from the MES layer 104 for execution within the automation layer 106. Moreover, it is to be appreciated that the MES interface component 102 can employ a predefined data structure to facilitate transporting portions of data between the MES layer 104 and the automation layer 106.

As illustrated, the MES interface component 102 can interface any suitable automation layer 106 via a personal computer (PC) to access a line 302 within the controller-based automation environment (e.g., the automation layer 106). The system 300 can support a list (e.g., an array) of control recipes comprised of equipment procedures (e.g., one per assembly).

As a new control recipe is received via the transport mechanism (e.g., the MES interface component 102), such control recipe can be placed into an order list 304. In one example, the transport mechanism (e.g., the MES interface component 102) can group a control recipe according to manufacturing rules. In another example, the control recipe can be placed into the order list 304 in the order received.

As a given assembly is placed on an assembly line, the physical assembly can be compared to the respective control recipe within a verification list 306. As the assembly is matched to the respective control recipe, the control recipe can move from the verification list 306 into a line list 308 (e.g., a line list work cell 1), as the physical assembly moves into the first work cell.

Each position in the line list 308 can represent a pitch position on the production line. A pitch position may be a work cell or conveyor buffer. The control recipe (e.g., contained in the line list) can continue to flow through the line list 308 as the physical assembly moves through each pitch position on the production line. It is to be appreciated that the line pitch can be a specific, unique and measurable point within the production line. The automation control system (e.g., the automation layer 106) can receive the control recipe via the standard MES data structure and transport mechanism implemented by the MES interface component 102, which can act on the embedded equipment procedure (e.g., or equipment procedures in the case of multiple lines) of the production line.

FIG. 4 illustrates a system 400 that facilitates implementing discrete manufacturing in accordance with the subject innovation. The system 400 can include a production line 402 that can include at least one work cell. It is to be appreciated that there can be any suitable number of work cells associated with the production line 402 such as work cell 1 to work cell N, where N is a positive integer. Moreover, it is to be understood that the depiction of six (6) work cells in FIG. 400 is only for the sake of brevity and any suitable number of work cells is to be considered within the scope of the claimed innovation. The flow of assemblies between work cells can be performed, for example, by a conveyor system; however the flow of assemblies can also be a manual function performed to certain Standard Operating Procedures (SOP). Thus, any suitable technique for moving assemblies between work cells can be employed with the subject innovation.

Discrete manufacturing can depend on a sequential performance of work at each work cell on the production line 402. However, it is to be appreciated that work cells can work and/or act in parallel. An equipment procedure can be executed in accordance to the physical layout of the production line 402. In other words, an equipment unit procedure can be executed sequentially as an assembly moves through the production line 402. The equipment procedure can rely on line pitch within the production line 402 to invoke the execution of equipment unit procedures. As an assembly moves through the production line 402, the control recipe (stored within the line list parameterizes) is executed within the equipment unit procedure and respective subordinate procedural elements. Thus, the above discussed technique can be utilized to execute the equipment procedure.

The MES interface component 12 can include various job execution instructions. In other words, the MES interface component 102 can be utilized to define at least one equipment operation that can be performed for a certain work order. The following table can outline a defined equipment operation supported by the claimed subject innovation, and more particularly, the MES interface component 102. It is to be appreciated and understood that the MES interface component 102 can support collapsibility; therefore operations can be replaced with equipment phases where operations are inapplicable.

| Equipment Op Type | Element | Description |
| --- | --- | --- |
| CL | Clamp | Performs the sequencing to clamp a part. |
| UC | Un-Clamp | Performs the sequencing to un-clamp a part. |
| LF | Lift | Performs the sequencing to lift of a part, at a work cell. |
| LO | Lower | Performs the sequencing to lower a part, at a work cell. |
| TI | Tooling In | Performs the sequencing of equipment required to move tooling in, towards the assembly. |
| TO | Tooling Out | Performs the sequencing of equipment required to move tooling out, away from the assembly. |
| TS | Test | Performs the sequencing required for testing a part. |
| FD | Feed Part | Performs the sequencing required for feeding a part or sub-assembly. |
| PP | Part Pick | Sequencing required for a part pick operation, allows the manual building of assemblies. |
| PV | Part Pick Verify | Sequencing required for a part pick operation with verification, allows the manual building of assemblies. |
| TR | Torque Results | Sequencing required for a torque with results operation with verification, allows the manual building of assemblies. |
| TV | Torque Verify | Sequencing required for a torque pass/fail operation with verification, allows the manual building of assemblies. |
| SP | Scan | Sequencing required for a torque with results operation with verification, allows the manual building of assemblies. |
| MA | Manual Action | Sequencing for operator prompts, or instructional text (SOP's). |

The following table can describe the data elements of each equipment operation within the MES interface component 102 and specifies the mapping to various MES objects.

| Element | Description | MES Object | MES Attribute | MES Implementation |
| --- | --- | --- | --- | --- |
| Production Line | Numeric value used to define a Production Line within a Site or Area. | Production Line | Number | Named UDA (long) |
| Work Cell ID | Numeric value, which identifies the Work Cell. Sometimes used to define a group of Work Cell's (when using Work Cell Secondary ID) | Work Center | StationNumber | Named UDA (long) |
| Work Cell Secondary ID | Value used to identify a particular Work Cell within a grouping of Work Cells. | Work Center | Side | Named UDA (long) |
| Equipment Operation | Numeric Value. Unique set for Line, Work Cell ID, and Work Cell Secondary ID. | Route Step | OperationNumber | Named UDA (long) |
| Equipment Operation Sequence Number | The position in the Equipment Unit Procedure to execute the Equipment Operation. | Route Step | OperationSequence | Named UDA (long) |
| Equipment Operation Type | Pneumonic used to identify the type of operation. See Table above. | Route Operation | Name | Built-in |
| Trace Event Type | Enumeration. Specifies the type of trace event to associate to the Equipment Operation | DCS Definition | Parameter (long) | Engineering Spec; link to Route Step |
| Exception Action Type | Enumeration. Specifies the action to followed upon exception. | DCS Definition | Parameter (long) | Engineering Spec; link to Route Step |
| Start Pitch % | 0 to < Judgment Pitch %. Specifies the Line Pitch position to begin executing the Equipment Unit Procedure. | DCS Definition | Parameter (long) | Engineering Spec; link to Route Step |

-continued

| Element | Description | MES Object | Attribute | Implementation |
|---|---|---|---|---|
| Judgment Pitch % | >Start Pitch % to 99. Specifies the Line Pitch position by which the Equipment Unit Procedure needs to be completed. | DCS Definition | Parameter (long) | Engineering Spec; link to Route Step |
| Device ID | Enumeration of devices supported by the automation system. | DCS Definition | Parameter (long) | Engineering Spec; link to Route Step |
| | | Equipment | Device Number | Named UDA (long) |
| Device Type | Pneumonic which defines the device type. | Equipment | Device Type | Named UDA (long) |
| Part Identifier | Pneumonic. Part identifier. | BOM Item | Part.Description | (native) |
| Number of Cycles | Numeric value. Defines the number of times a given operation needs to run per instance. | DCS Definition | Parameter (long) | Engineering Spec; link to Equipment |
| Parameter 1 | Definable data item | DCS Definition | Parameter (long) | Engineering Spec; link to Equipment |
| . | Array of data items, sized to suit system | DCS Definition | Parameter (long) | Engineering Spec; link to Equipment |
| . | Array of data items, sized to suit system | DCS Definition | Parameter (long) | Engineering Spec; link to Equipment |
| Parameter x | Definable data item | DCS Definition | Parameter (long) | Engineering Spec; link to Equipment |

The following table illustrates numerous examples in accordance with the subject innovation. It is to be appreciated that the below examples are solely for illustration and are not to be limiting on the claimed subject matter and/or the scope of the MES interface component 102. For instance, the below examples are implemented within the design for automotive discrete manufacturing. However, such examples can be applied to any suitable industry with substantially similar requirements and/or any suitable discrete manufacturing environment/system. Moreover, the MES Interface Component 102 is abbreviated as MIC within the below tables of examples.

| Op. Type | In MIC | Element | Description | MES Object | Attribute | Implementation |
|---|---|---|---|---|---|---|
| PP | | | Specific MIC elements for PP Operation Type (Part pick without pick verification) | | | |
| | Y | Storage Location Number (e.g. Bin Number) | 1-12 maximum (16-bit module) or 1-28 maximum (2 16-bit modules or 1 32-bit module) (per side) | Location | Storage Location Number | Named UDA |
| | Y | Part Identifier Value | Picked part identifier value (for display only) | BOM Item | Part. Description | (native) |
| PV | | | Specific MIC elements for PV Operation Type (Part pick with picked item verification by sensor(s)) | | | |
| | Y | Storage Location Number (e.g. Bin Number) | 1-12 maximum (16-bit module) or 1-28 maximum (2 16-bit modules or 1 32-bit module) (per side) | Location | Storage Location Number | Named UDA |
| | Y | Part Identifier Value | Picked part identifier value (for display only) | BOM Item | Part Description | (native) |

-continued

| Op. Type | In MIC | Element | Description | MES Object | Attribute | Implementation |
|---|---|---|---|---|---|---|
| TR | | Specific MIC elements for TR Operation Type (Torque tool without torque target parameters) | | | | |
| | Y | Torque Tool Number | 1-4 (per side) | DCS Definition | Parameter (long) | Engineering Spec; link to Route Step |
| | | | | Equipment | Torque Tool Number | Named UDA (long) |
| | N | Tool Type | Enumerated values 1-99 | Equipment | Torque Tool Type | Named UDA (long) |
| | Y | Number of Rundowns | 1-9 (may be limited to <8) (trace event reported as operation step) | DCS Definition | Parameter (long) | Engineering Spec; link to Equipment |
| | Y | Part Identifier Value | Installed part identifier value (for display only) | BOM Item | Part. Description | (native) |
| TV | | Specific MIC elements for TV Operation Type (Torque tool with parameters and/or value feedback) | | | | |
| | Y | Torque Tool Number | 1-2 (per side) | DCS Definition | Parameter (long) | Engineering Spec; link to Route Step |
| | | | | Equipment | Torque Tool Number | Named UDA (long) |
| | N | Torque Tool Type | Enumerated values 1-99 | Equipment | Torque Tool Type | Named UDA (long) |
| | Y | Number of Rundowns | 1-9 (may be limited to <8) | DCS Definition | Parameter (long) | Engineering Spec; link to Equipment |
| | Y | Program Number | Enumerated values 0-99 | DCS Definition | Parameter (long) | Engineering Spec; link to Equipment |
| | Y | Torque High Limit Integer | 0-127 (limited to byte) | DCS Definition | Parameter (long) | Engineering Spec; link to Equipment |
| | Y | Torque High Limit Hundredths | 0-99 (limited to byte) | DCS Definition | Parameter (long) | Engineering Spec; link to Equipment |
| | Y | Torque Low Limit Integer | 0-127 (limited to byte) | DCS Definition | Parameter (long) | Engineering Spec; link to Equipment |
| | Y | Torque Low Limit Hundredths | 0-99 (limited to byte) | DCS Definition | Parameter (long) | Engineering Spec; link to Equipment |
| | Y | Part Identifier Value | Installed part identifier value (for display only) | BOM Item | Part. Description | (native) |

Figure 5:
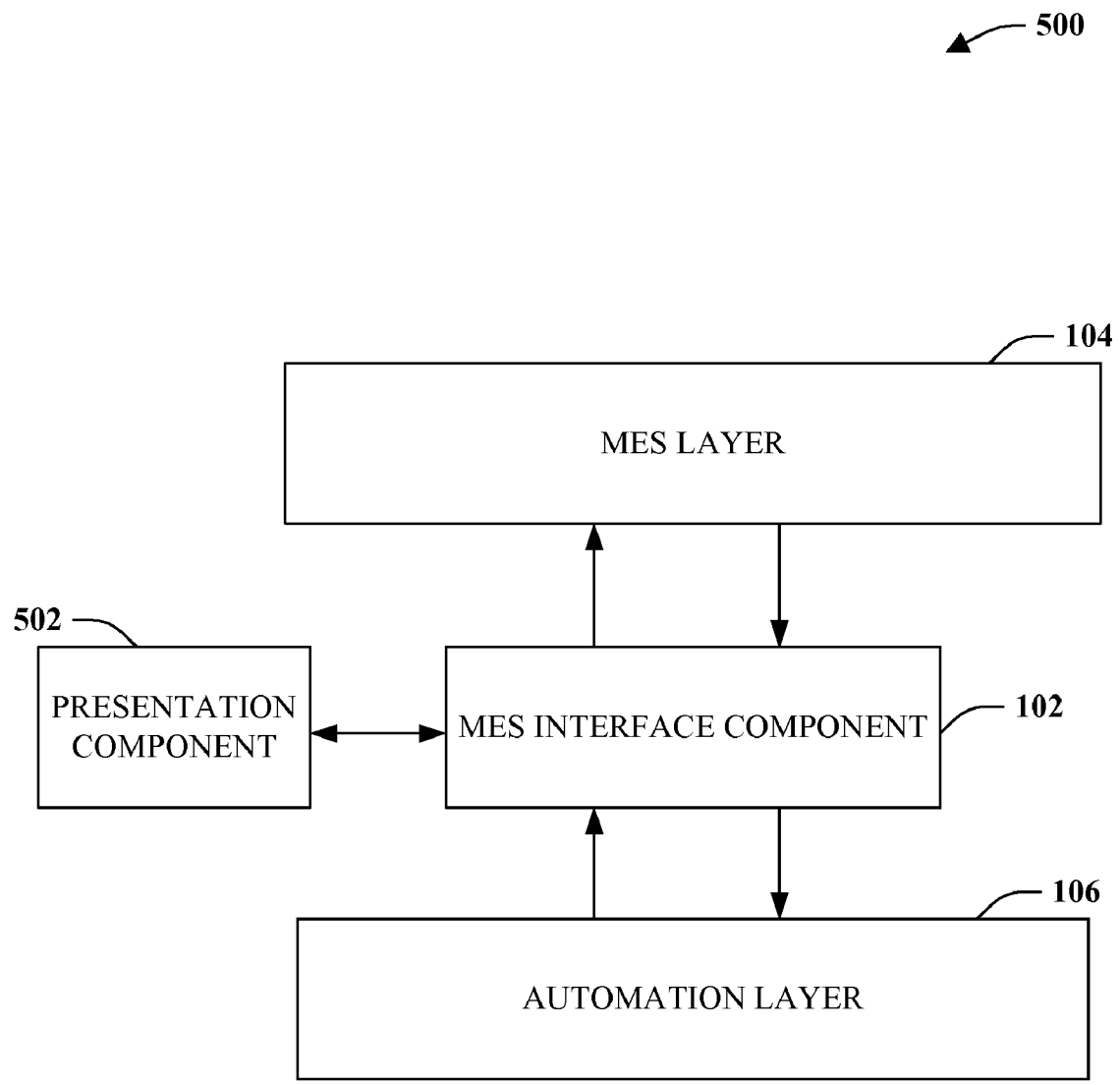
FIG. 5 illustrates a block diagram of an exemplary system that facilitates utilizing a standard MES interface to seamlessly execute a control recipe from an MES system in a controller-based automation environment.

FIG. 5 illustrates a system 500 that facilitates utilizing a standard MES interface to seamlessly execute a control recipe from an MES system in a controller-based automation environment. The MES interface component 102 can further utilize a presentation component 502 that provides various types of user interfaces to facilitate interaction between a user and any component coupled to the MES interface component 102. As depicted, the presentation component 502 is a separate entity that can be utilized with the MES interface component 102. However, it is to be appreciated that the presentation component 502 and/or similar view components can be incorporated into the MES interface component 102 and/or a stand-alone unit. The presentation component 502 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the MES interface component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
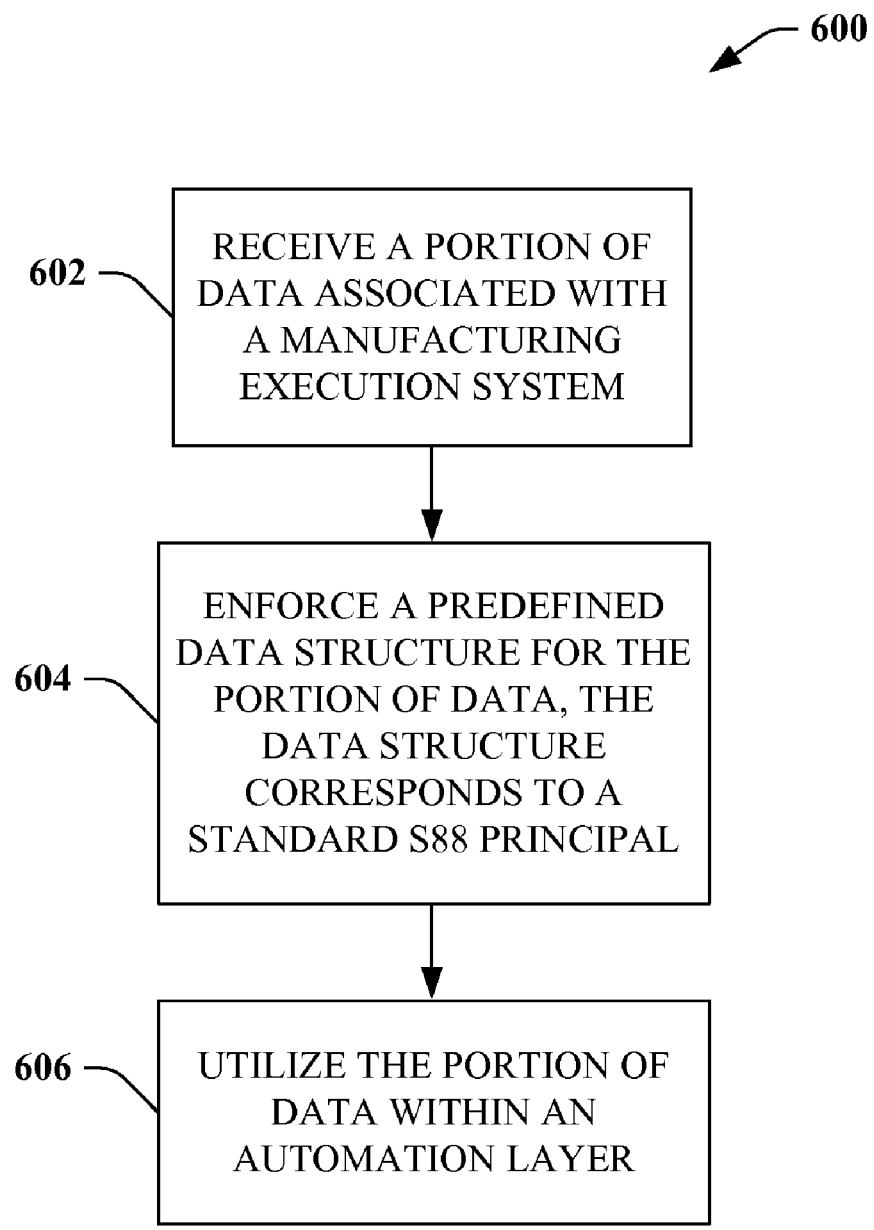
FIG. 6 illustrates an exemplary methodology for communicating data between a Manufacturing Execution System (MES) and an automation environment.
Figure 7:
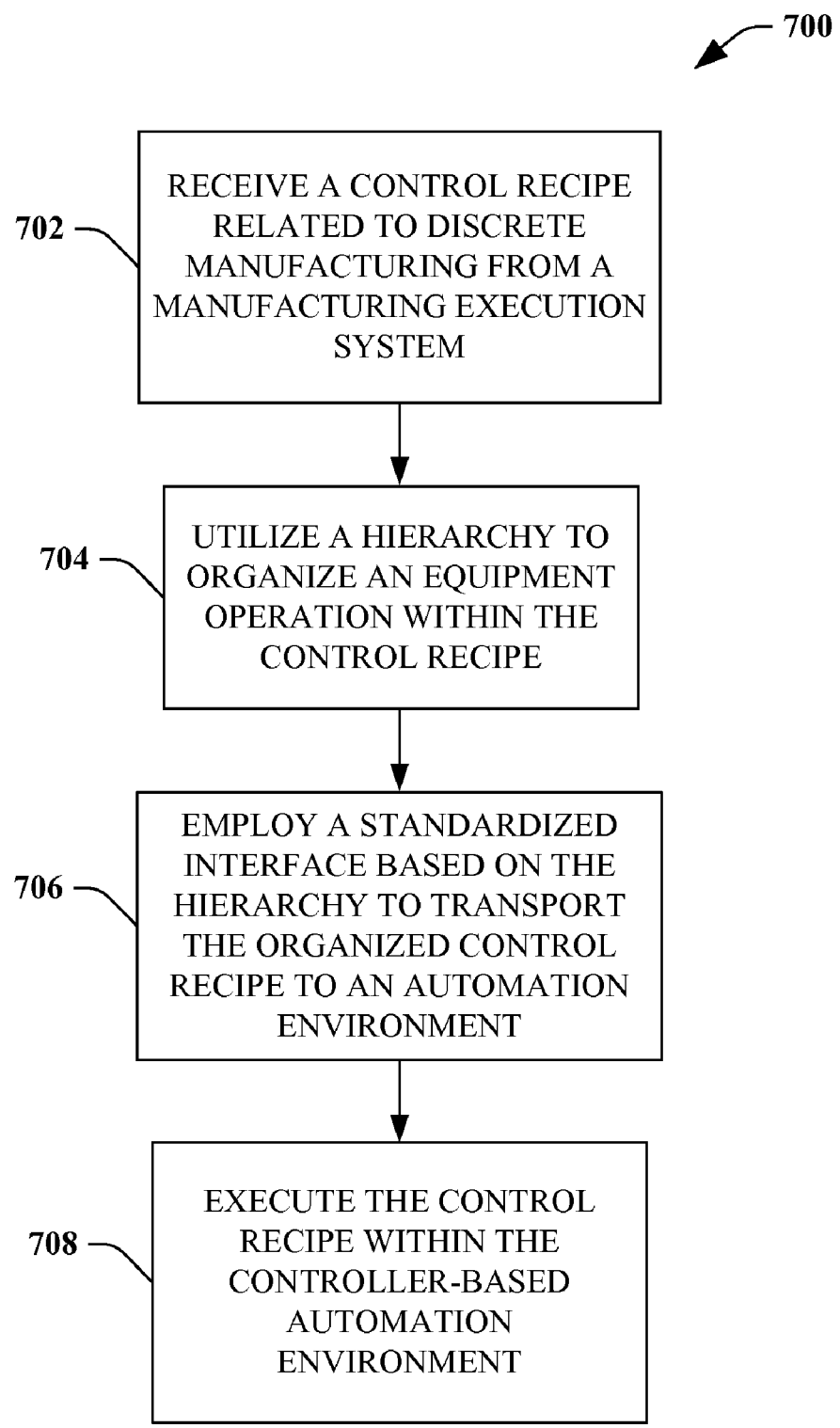
FIG. 7 illustrates an exemplary methodology that facilitates utilizing a control recipe associated with a Manufacturing Execution System (MES) within a controller-based recipe execution system via a universal MES interface.

Referring to FIGS. 6-7, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a methodology 600 for communicating data between a Manufacturing Execution System (MES) and an automation environment. At reference numeral 602, a portion of data associated with a manufacturing execution system (MES) can be received. The portion of data can be, for example, a control recipe, a recipe, a set of instructions related to a manufacturing process (e.g., batch, discrete, etc.). In particular, the control recipe can be a set of information that uniquely defines the production requirements for a specific product which, through execution, defines the manufacture of a single batch of a specific product. Furthermore, the MES can be any suitable MES that can include at least one control recipe in connection with a discrete manufacturer, company, enterprise, and the like. For instance, the MES can be a shop floor control system which includes either manual or automatic labor and production reporting as well as on-line inquiries and links to tasks that take place on the production floor. Furthermore, the MES can include links to work orders, receipt of goods, shipping, quality control, maintenance, scheduling, and other related tasks.

At reference numeral 604, a predefined data structure can be enforced for the portion of data, wherein the data structure can correspond to a standard S88 principal. For example, the principal can relate to Object Oriented Programming and/or any other suitable modular programming techniques. For instance, the following principals or concepts can be utilized: 1) Encapsulation—Encapsulation can dictate that an object's data can be accessed/modified by the object's methods, and can not be accessed/modified directly by the object's client; 2) Polymorphism—Polymorphism can be the ability of multiple Objects to be treated the same by their clients, although they may behave quite differently; and/or 3) Inheritance—Inheritance can refer to a Class of Objects or Sub-Class, which may automatically inherit the specific characteristics from an existing Class.

At reference numeral 606, the portion of data can be utilized within an automation layer (e.g., an automation environment, an automation system, a controller-based environment, a controller-based system, a control recipe execution system, etc.). The portion of data can be seamlessly communicated from the MES to the automation layer based at least in part upon the standardized techniques and/or the predefined data structure for the portion of data. Thus, in general, the methodology 600 provides a standardized and universal predefined data structure that transports data between an MES and an automation environment/layer. It is to be appreciated and understood that the automation layer can be any suitable controller-based automation environment, controller-based automation manufacturer, automation factory, automation enterprise, controller-based recipe execution system, and the like.

FIG. 7 illustrates a methodology 700 that facilitates utilizing a control recipe associated with a Manufacturing Execution System (MES) within a controller-based recipe execution system via a universal MES interface. At reference numeral 702, a control recipe related to discrete manufacturing can be received from a manufacturing execution system (MES). At reference numeral 704, a hierarchy can be utilized to organize an equipment operation within the control recipe. For example, the hierarchy can be a recipe procedure that references an equipment procedure that is an ordered set of an equipment unit procedure that is an ordered set of an equipment operation that is an ordered set of an equipment phase. In other words, a predefined data structure can be utilized in accordance with the control recipe from the MES.

At reference numeral 706, a standardized interface can be employed based at least in part upon the hierarchy, wherein the standardized interface can transport the organized control recipe to an automation environment. It is to be appreciated that the automation environment can be any suitable controller-based environment that can implement a portion of discrete manufacturing. At reference numeral 708, the control recipe can be executed within the controller-based automation environment. Thus, a standardized and universal technique to transport and execute a control recipe from an MES to an automation environment can be utilized.

Figure 8:
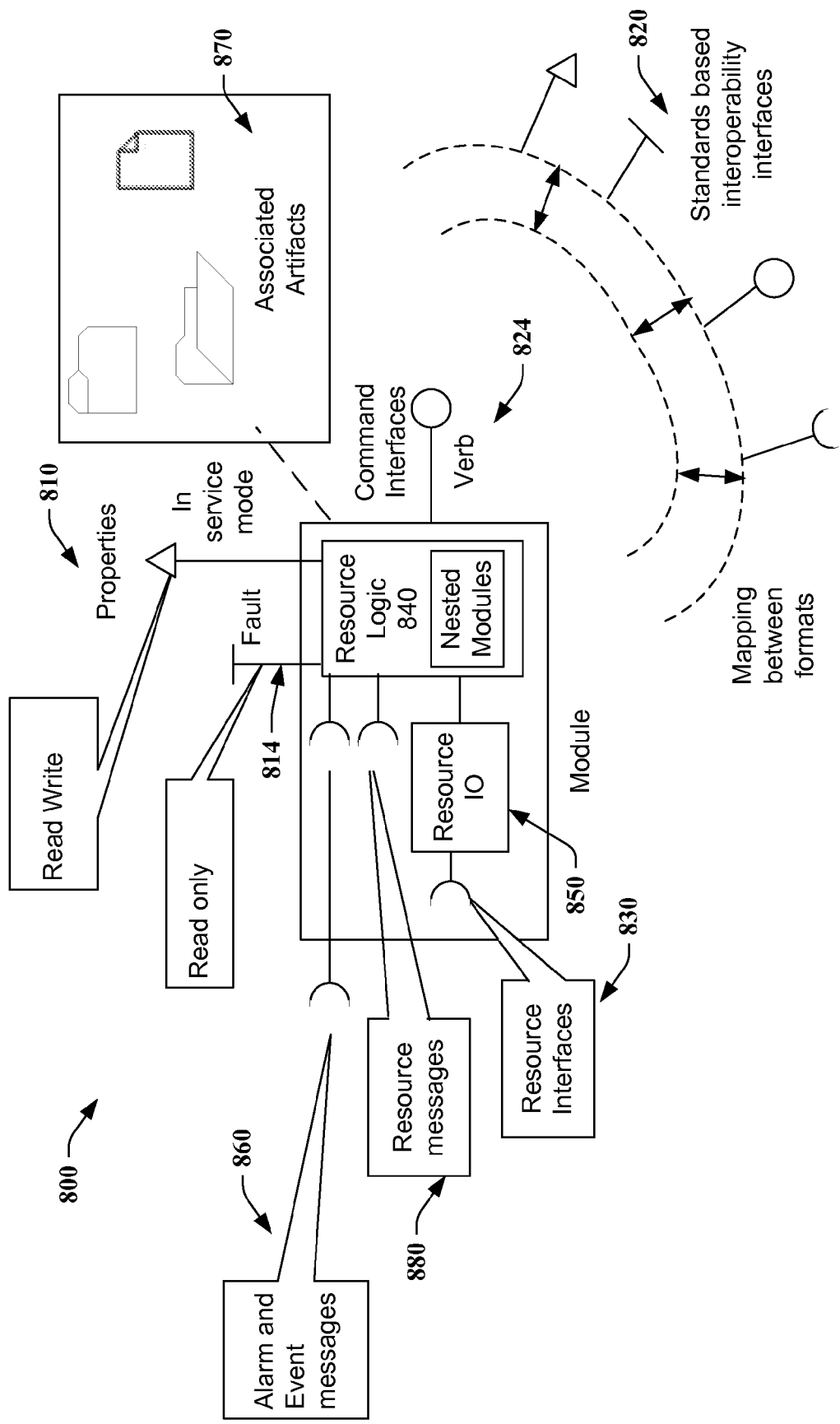
FIG. 8 is a diagram illustrating module attributes.

Turning now to FIG. 8, module attributes 800 are illustrated. The attributes 800 depicted in FIG. 8 include a common (or exemplary) representation that can be modules from modules. Generally, a set of standard attributes can be determined that are common to all modules. Similarly, for other types of modules described below, additional standard attributes can be defined. An example of a property 810 available on modules includes attributes such as Fault and Status at 814. Active resource modules (e.g., equipment and personnel) can support additional properties 810 such as available/unavailable.

Attributes presented below are represented as associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 can be associated with various common usage scenarios. For example, interfaces 820 can be used as access points that can hook in real time diagnostics, security and so forth.

Public verbs 824 initiate an action within the module. The activity is described to clients of the interface 820. The implementation is considered private and is not presented to clients. Examples can include Open, Stop, Abort, Shut, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820, e.g., Conversion Map, Name, Description, expiry date, personnel contact information. Some properties 810 can be common to all instances of resource modules (e.g., scanned copy of resource specification documents), whereas other properties 810 are specific to each module instance (e.g., Status, percent open).

At 830, internal resource interfaces include interfaces from logic 840 in the module to the resource being managed at 850, where the logic includes code and/or configuration(s) that process a command and/or update state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module and can enable the public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that can be exposed as runtime messages visible to external systems during the execution of the module. This includes alarms and events explicitly coded by the developer and system messages promoted to be visible by external systems. At 870, one or more artifacts include information that document the operation and structure of the resource such as, for example, wiring diagrams, warranties, payroll, parts supplier information, and so forth. Visualization aspects include associated graphics that present the resource state and properties to applications interacting with the resource. For example, the artifacts can include faceplates, icons, state overlays, edit dialogs, help files, etc. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 9:
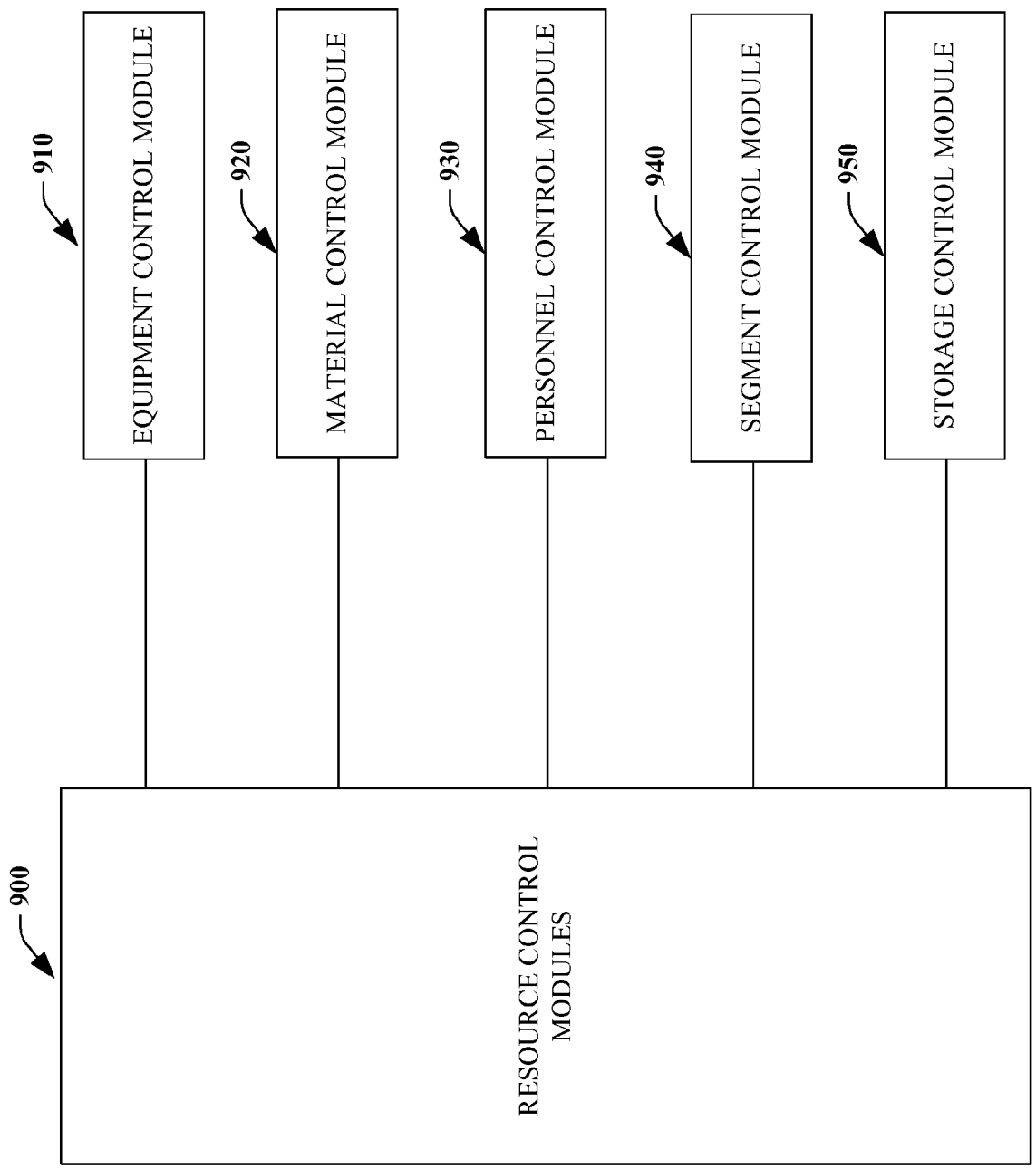
FIG. 9 is a diagram illustrating example resource control modules.

Turning to FIG. 9, example resource control modules 900 are illustrated. In general, resource control modules 900 provide simple control of one or more resources. The resource control module (RCM) 900 represents the logic to manage the state or data of the resource and may include other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include the following.

At 910, an Equipment Control Module (Common name="Control Module") CM can be provided, which can be the simplest form of basic regulatory control of equipment. The equipment control module 910 can encapsulate the equipment and its control such as control of values, drives, and so forth. At 920, a Material Control Module (MCM) can be provided. Management of material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes manipulation of simple storage logic such as buffer capacity and ordering into and out of a queue for the respective storage unit or requirement.

Figure 10:
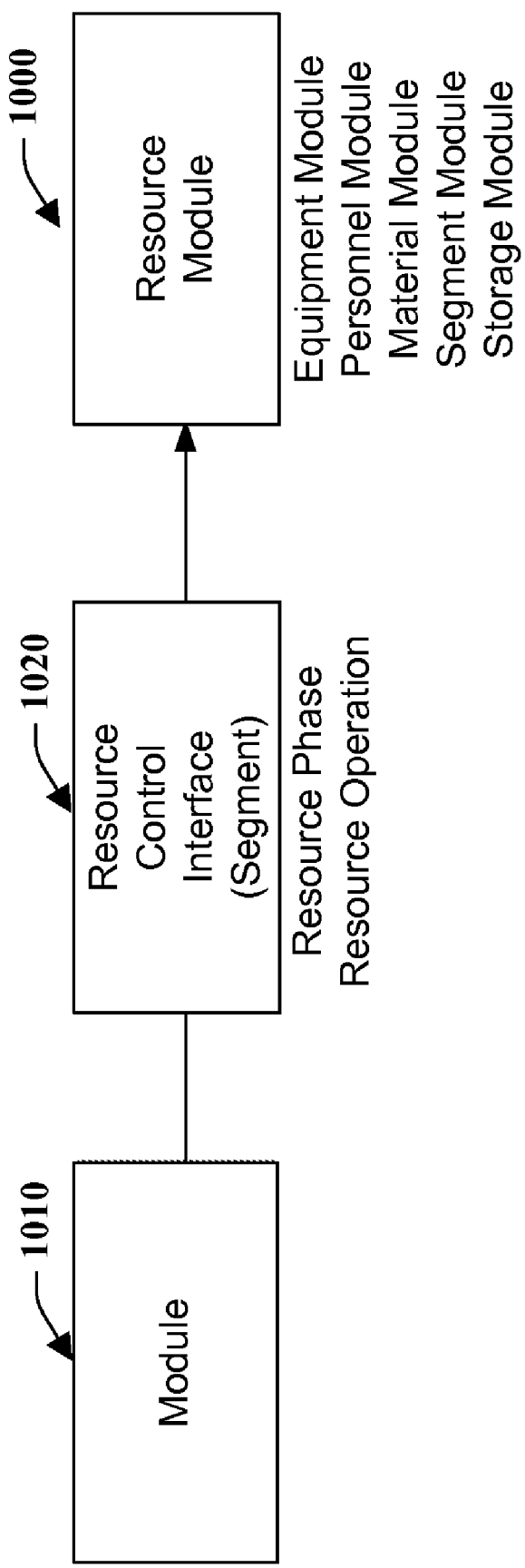
FIG. 10 is a diagram illustrating a resource module.

FIG. 10 illustrates a resource module 1000 for an industrial control system. Resource modules 1000 extend resource control modules described above to enable coordination of resources (e.g., equipment, people, modules, etc.). As shown, the resource control module 1000 includes a module 1010 and a resource control interface 1020. Resource modules 1000 are also able to represent more complex activities than resource control modules. For example, resource modules 1000 may include other resource control modules at 1010 and/or other resource modules. For example, an equipment module may leverage a subordinate material control module to represent material handling aspects or a segment module to solicit an electronic signature.

Before proceeding it is noted that other types of modules are possible other than those shown. For instance, a configuration module may include management definitions and configuration of resources—personnel, material, equipment, segments, storage, and so forth. Another type of module includes nested modules where a module references other modules. These modules may be children of a parent module or shared from one module to another. Resource modules may include resource control modules; however, resource control modules should not include resource modules. Modules can include modules focused on other resource types; for example, an equipment module may include equipment modules and material modules.

Figure 11:
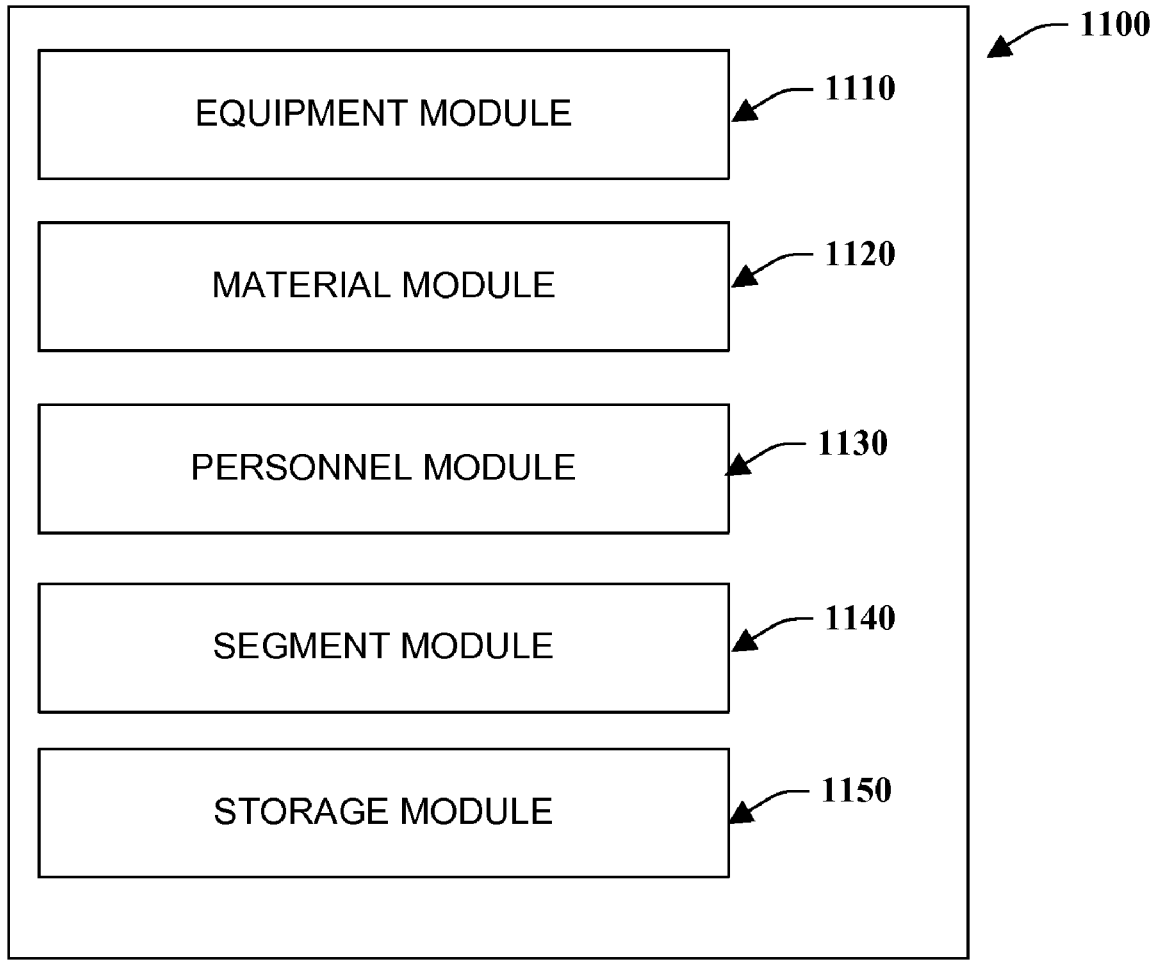
FIG. 11 is a diagram illustrating example resource modules.

FIG. 11 illustrates example resource modules 1100 for an industrial control system. At 1110, an Equipment Module provides coordination of equipment modules and equipment control modules to perform a process-orientated task independent of specific material e.g., In-feed, AGV controller, Conveyor, and so forth. At 1120, a Material Module provides coordination of material modules and material control modules to perform material focused tasks e.g., material reservation, provision, material mass balance calculation, bill of material management, work order management, and so forth. At 1130, a Personnel Module provides coordination of personnel modules and personnel control modules to perform personnel focused tasks e.g., electronic signature collection, security validation, certification validation, manual control interactions, and so forth.

At 1140, a Segment Module provides coordination of segment modules and segment control modules to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing. The segment module 1140 may also construct a sequence to be followed that can be applied as manual, automatic or semi automatic sequences (e.g., route, recipe execution) At 1150, a Storage Module provides coordination of storage related activities, allocation of storage to requestors, modeling of inventory calculations and so forth. This also includes interaction with higher-level systems that manage storage and inventory information.

Figure 12:
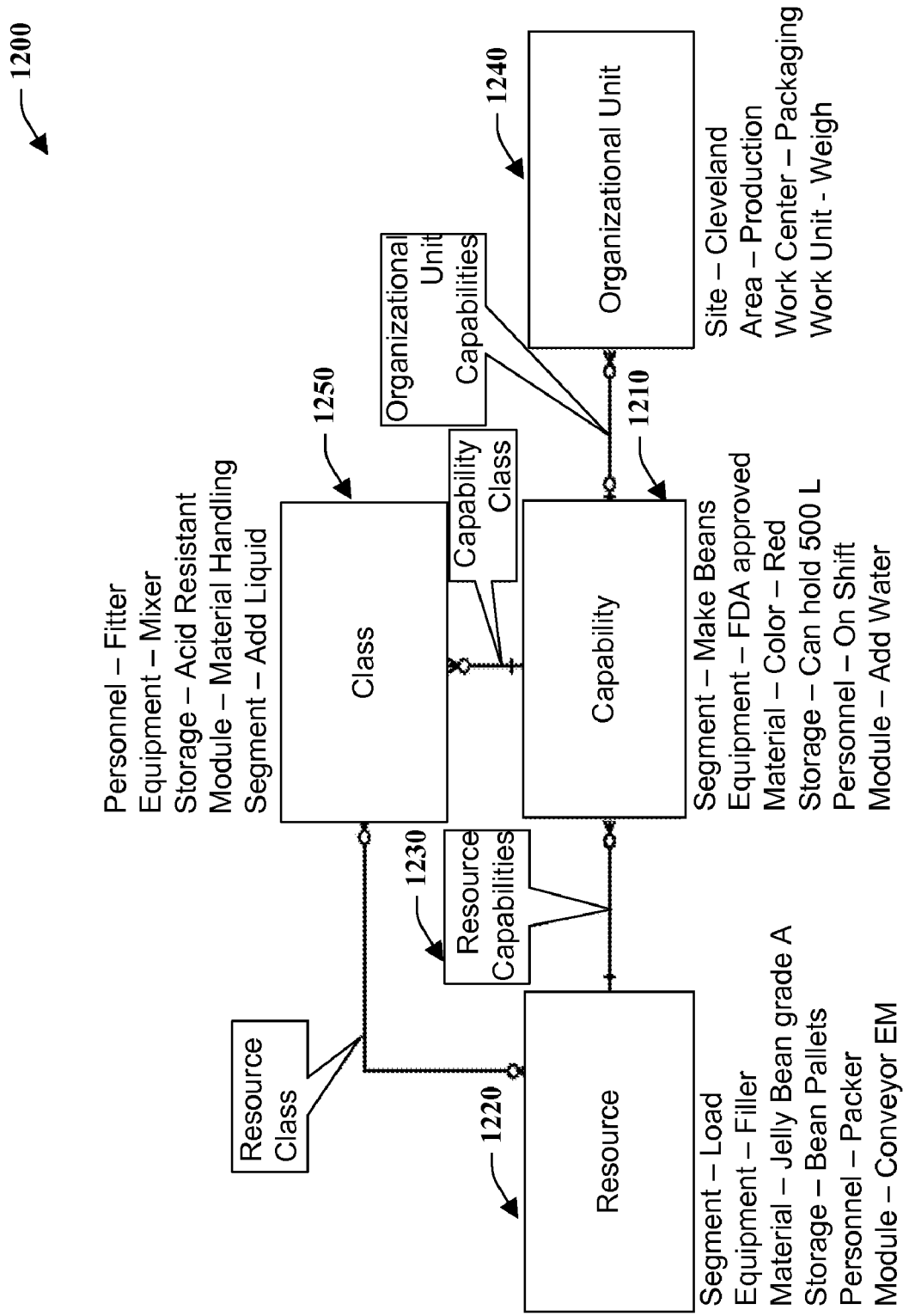
FIG. 12 is a diagram illustrating a resource control model.

FIG. 12 illustrates an example resource control model 1200 for an industrial control system. Resource Control Interfaces are the interfaces exposed to production management systems for resource binding and arbitration purposes. The interfaces are elements of the resource control model 1200 including procedures, operations or phases. These interfaces are made available by exposure via one or more capabilities 1210 described below. Procedures, operations and phases depicted in this model 1200 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1220 such as material, equipment, personnel, etc. are considered during the binding process of product production rules to work centers (e.g., production lines, process cells, etc.). These selection processes evaluate resource capabilities to locate the appropriate resource for the task.

Resource capabilities 1210 include the resource 1220 required to perform work in a production system. Consequently, resources 1220 are at the center of efficiency, capacity, scheduling and arbitration considerations. A resource's ability to work or be available to allow work to commence is represented as resource capability at 1230. The existence of capability 1230 associated with a resource 1220 does not make the resource available for production; the resource's capability 1230 is associated with organizational units 1240 that can support the respective resource capability. For example, an operator (personnel resource) may have qualifications for a Mixer in line 1, where this qualification capability is only in effect with that specific mixer unless explicitly directed. Resource arbitration algorithms can search for resource capabilities 1230 in the scope of organizational units 1240 they are to be executed within.

Resources 1220 publish capabilities to organizational units 1240 for use by system processes in a given scope. Modules are a type of resource and can be accessed directly by published capabilities 1210. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1210. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1200, the resource 1220 and capability can be associated with a higher-level class or abstraction 1250.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
an MES interface component that receives a portion of recipe data associated with discrete manufacturing from a manufacturing execution system (MES); organizes the portion of recipe data according to an equipment control hierarchy, wherein the portion of recipe data includes an equipment procedure; places the portion of recipe data into a list of control recipes, wherein the control recipes are embedded with at least one equipment procedure per control recipe; and delivers the list to at least one production line controller within a controller-based discrete automation environment.

2. The system of claim 1, the portion of recipe data is a control recipe, the control recipe is a set of information that uniquely defines at least one production requirement for a product which, through execution, defines a manufacture of a single batch of the product.

3. The system of claim 1, the MES interface component enforces a modular programming principal related to at least one of Object Oriented Programming, an S95standard or an S88 standard.

4. The system of claim 3, the principal is at least one of encapsulation, polymorphism, or inheritance.

5. The system of claim 1, the hierarchy is the following: a control recipe includes a recipe procedure that references an equipment procedure that is an ordered set of an equipment unit procedure that is an ordered set of an equipment operation that is an ordered set of an equipment phase.

6. The system of claim 5, further comprising at least one of the following: a production line related to the controller-based discrete automation environment corresponding to the equipment procedure; a work cell related to the controller-based discrete automation environment corresponding to the equipment unit procedure; or a work cell relationship related to the controller-based discrete automation environment corresponding to the equipment unit procedure.

7. The system of claim 1, the MES interface component treats two or more work cells associated with the controller-based discrete automation environment as similar objects, wherein the work cells are made up of a hierarchy of equipment phases, equipment modules, and control modules.

8. The system of claim 1, the MES interface component translates the portion of recipe data for at least one of the equipment operation or the equipment phase and places the portion of recipe data into the predefined data structure.

9. The system of claim 1, the portion of recipe data is placed into an order list, wherein a verification list authenticates the portion of recipe data.

10. The system of claim 9, the portion of recipe data moves into a line list for a work cell in coordination of a physical assembly moving into the work cell, a position on the line list represents a pitch position on a production line within the controller-based discrete automation environment.

11. The system of claim 10, the automation layer receives and acts upon the portion of data and embedded equipment procedure of the production line.

12. The system of claim 11, the equipment procedure is executed in accordance to a physical layout of the production line.

13. The system of claim 12, the equipment unit procedure is executed sequentially as an assembly moves through the production line, wherein the equipment procedure relies on line pitch within the production line to invoke the execution of the equipment unit procedure.

14. The system of claim 13, the portion of recipe data is executed within the equipment unit procedure and a subordinate procedural element, the portion of recipe data is stored within the line list.

15. The system of claim 1, further comprising a controller within the controller-based discrete automation environment, the controller is responsible for at least one of the following: an execution of a work cell level sequencing; a safety interlock; a personnel interlock; a persistent control at a device level; data shifting as a component moves down a production line; or data manipulation as a component moves down a production line.

16. A computer-implemented method that facilitates communicating data from a manufacturing execution system (MES) and an automation environment, comprising:
receiving a portion of data associated with a manufacturing execution system (MES), wherein the portion of data is associated with discrete manufacturing;
organizing the portion of recipe data according to an equipment control hierarchy, comprising embedding at least one equipment procedure within the portion of data;
placing the portion of recipe data in a list of control recipes, wherein the control recipes are embedded with at least one equipment procedure per control recipe; and
delivering the list to at least one production line controller within an automation environment.

17. The method of claim 16, further comprising:
utilizing a hierarchy to organize an equipment operation associated with the portion of data; and
employing a standardized interface based on the hierarchy to transport the organized portion of data to the automation environment.

18. The method of claim 16, the portion of data is a control recipe.

19. The method of claim 16, further comprising interfacing the MES and the automation environment with a standardized interface having the predefined data structure and a transportation technique for the portion of data within the MES.

20. The method of claim 16, further comprising sequentially executing the portions of data based upon an organized hierarchy of equipment operation associated with the automation environment.

21. A computer-implemented system that facilitates data transportation between two or more systems, comprising:
a manufacturing execution system (MES) that defines a portion of recipe data associated with a discrete manufacturing process;
a delivery system that: receives the portion of recipe data from the MES; formats the portion of recipe data in accordance with an equipment control hierarchy, wherein the portion of recipe data is embedded with an equipment procedure; places the portion of recipe data into a list of control recipes, wherein the control recipes are embedded with at least one equipment procedure per control recipe; and delivers the list to at least one production line controller within a controller-based discrete automation environment; and
the controller-based discrete automation environment that executes the portion of recipe data.

* * * * *